(12) United States Patent
Barrenscheen et al.

(10) Patent No.: US 7,047,155 B2
(45) Date of Patent: May 16, 2006

(54) BUS INTERFACE

(75) Inventors: Jens Barrenscheen, München (DE); Achim Vowe, München (DE)

(73) Assignee: Infineon Technologies AG, Munich (DE)

( * ) Notice: Subject to any disclaimer, the term of this patent is extended or adjusted under 35 U.S.C. 154(b) by 172 days.

(21) Appl. No.: 10/284,807

(22) Filed: Oct. 31, 2002

(65) Prior Publication Data
US 2003/0084363 A1    May 1, 2003

(30) Foreign Application Priority Data
Oct. 31, 2001    (EP) .................................. 01125995

(51) Int. Cl.
G06F 13/42    (2006.01)
(52) U.S. Cl. .................................................... 702/176
(58) Field of Classification Search ................ 702/190, 702/187, 127, 123, 119, 159, 183, 90, 176; 395/200; 714/47; 347/191; 364/138; 370/449, 370/451, 536, 352, 493, 276, 286, 271, 216, 370/16, 527, 395, 462; 713/400, 402, 600; 709/253; 711/103, 106; 307/87; 710/49, 710/16, 100; 326/37; 712/36; 376/451; 327/281, 280; 318/811, 603; 270/30; 477/3; 222/1; 320/128

See application file for complete search history.

(56) References Cited

U.S. PATENT DOCUMENTS

| 4,159,516 | A | * | 6/1979 | Henrion et al. ................ 710/49 |
| 5,095,425 | A | | 3/1992 | Hesse |
| 5,267,251 | A | | 11/1993 | Lenoir et al. |
| 5,300,837 | A | * | 4/1994 | Fischer ........................ 327/281 |
| 5,434,861 | A | * | 7/1995 | Pritty et al. .................. 370/449 |
| 5,448,180 | A | | 9/1995 | Kienzler et al. |
| 5,448,561 | A | | 9/1995 | Kaiser et al. |
| 5,524,213 | A | * | 6/1996 | Dais et al. ................... 709/207 |
| 5,666,049 | A | * | 9/1997 | Yamada et al. ........... 324/158.1 |
| 5,892,927 | A | | 4/1999 | Boehmer et al. |
| 2003/0223407 | A1 | * | 12/2003 | Sharma et al. .............. 370/352 |

FOREIGN PATENT DOCUMENTS

DE    34 02 076 A1    8/1985
FR    2 726 675 A1    5/1996

OTHER PUBLICATIONS

Florian Hartwich et al.: "The Configuration of the CAN Bit Timing", 6th *International CAN Conference*, Turin, Italy, Nov. 1-4, 1999, pp. 1-10, XP-002236869.

* cited by examiner

*Primary Examiner*—John Barlow
*Assistant Examiner*—Tung Lau
(74) *Attorney, Agent, or Firm*—Laurence A. Greenberg; Werner H. Stemer; Ralph E. Locher

(57) ABSTRACT

A bus interface connects a device to a bus that connects a plurality of devices to one another. The bus interface described is distinguished in that a timer provided in the bus interface or a timer provided in the chip that contains the bus interface is used to ascertain the timing of operations taking place within the bus interface and/or on the bus. This allows data required for configuring the bus interface to be acquired more simply, more quickly, more accurately and more comprehensively than is the case up to now. In addition, the bus interface is consequently able to match itself to the given circumstances.

34 Claims, 2 Drawing Sheets

BUS INTERFACE

BACKGROUND OF THE INVENTION

Field of the Invention

The present invention relates to a bus interface for connecting a device to a bus that connects a plurality of devices to one another.

One bus connecting a plurality of devices to one another is, by way of example, the controller area network (CAN) bus; the bus interface which, to connect a device to the CAN bus, needs to be provided between the device in question and the CAN bus is frequently also referred to as a CAN controller.

SUMMARY OF THE INVENTION

It is accordingly an object of the invention to provide a bus interface that overcomes the above-mentioned disadvantages of the prior art devices of this general type, which simplifies the initialization and alteration of bus systems.

The inventive bus interface is distinguished in that a timer provided in the bus interface or a timer provided in the chip that contains the bus interface is used to ascertain the timing of operations taking place within the bus interface and/or on the bus.

This allows the data required for configuring the bus interface to be ascertained more simply, more quickly and more accurately than is possible when the data in question are ascertained by an external test unit.

In addition, the timer can even obtain information such as internal signal delay times and internal states (sampling instant, data transmission instant, protocol state, etc.) in the bus interface, the information not being able to be obtained at all when an external test unit is used.

Furthermore, the bus interface is also able to match itself to the given circumstances autonomously.

In addition, the timer can also be used to perform a self-test which allows the integrity of the bus connection to be tested. Such a test option can be of crucial significance for the usability of the bus interface, particularly in safety-related applications.

In accordance with an added feature of the invention, the timer is connected and actuated such that the timer ascertains a reciprocal value for a transmission rate of data transferred from another bus node via the bus. The reciprocal value for the transmission rate is ascertained by virtue of the timer ascertaining a length of time that elapses between an occurrence of two particular edges in a signal transmitted via the bus. A result of the ascertainment is used to stipulate the transmission rate of data needed to be used by the bus interface.

In accordance with an additional feature of the invention, the timer is connected and actuated such that the timer ascertains a length of time between an instant at which a first signal supplied to the timer is sampled and an occurrence of an edge in a second signal to be sampled which occurs before or after a sampling instant. A result of the ascertainment is used to stipulate instants at which the bus interface samples signals that are supplied to the bus interface.

In accordance with another feature of the invention, the timer is connected and actuated such that the timer ascertains an internal signal delay time for the bus interface.

In accordance with a further feature of the invention, an output connection is connected to the bus, and an input connection is connected to the bus. The internal signal delay time is ascertained by ascertaining a length of time that elapses before a signal which is to be output onto the bus has passed from a first location within the bus interface through the output connection and through the input connection to a second location within the bus interface. The output connection and the input connection are connected to one another while the internal signal delay time is ascertained.

In accordance with another added feature of the invention, a result of the ascertainment is used to check a correct operation of the bus interface.

In accordance with another additional feature of the invention, the timer is connected and actuated such that the timer ascertains a length of time which elapses for a signal which is to be output onto the bus passes from a first location within the bus interface, over the bus, to a second location within the bus interface. A result of the ascertainment is used to set a driver strength for a driver by which signals which are to be output onto the bus from the bus interface are output onto the bus.

In accordance with another further feature of the invention, the length of time to be ascertained is ascertained by virtue of the timer counting pulses in a clock signal supplied to the timer during a period of time whose length is to be ascertained.

In accordance with a further added feature of the invention, the timer is connected and actuated such that the timer generates an information item that indicates an instant at which the bus interface received data transferred via the bus.

In accordance with a concomitant feature of the invention, the timer is connected and actuated such that the timer generates an information item that indicates an order in which the bus interface received data transferred via the bus.

Other features which are considered as characteristic for the invention are set forth in the appended claims.

Although the invention is illustrated and described herein as embodied in a bus interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
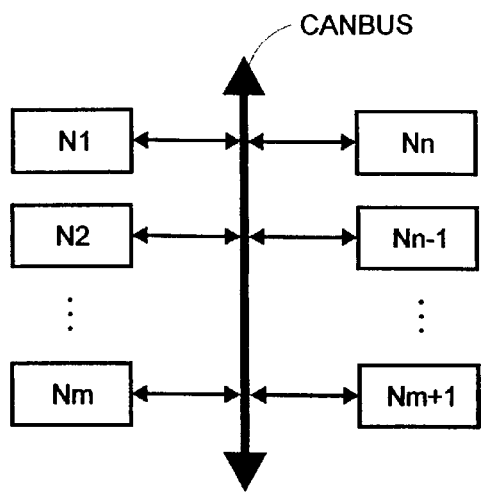
FIG. 1 is a block diagram of a CAN bus system.

Referring now to the figures of the drawing in detail and first, particularly, to FIG. 1, there is shown an example of a configuration containing a CAN bus.

The configuration shown contains a CAN bus CANBUS and devices N1 to Nn connected thereto, which are generally referred to as nodes. The nodes N1 to Nn respectively contain the device which is actually to be connected to the CAN bus and the CAN controller, which allows the device which is to be connected to the CAN bus to be correctly connected to the CAN bus. The device to be connected to the CAN bus can be any device, for example a microcontroller or another control device, a sensor, an actuator, a user interface such as a keyboard or a display device, etc.

Figure 2:
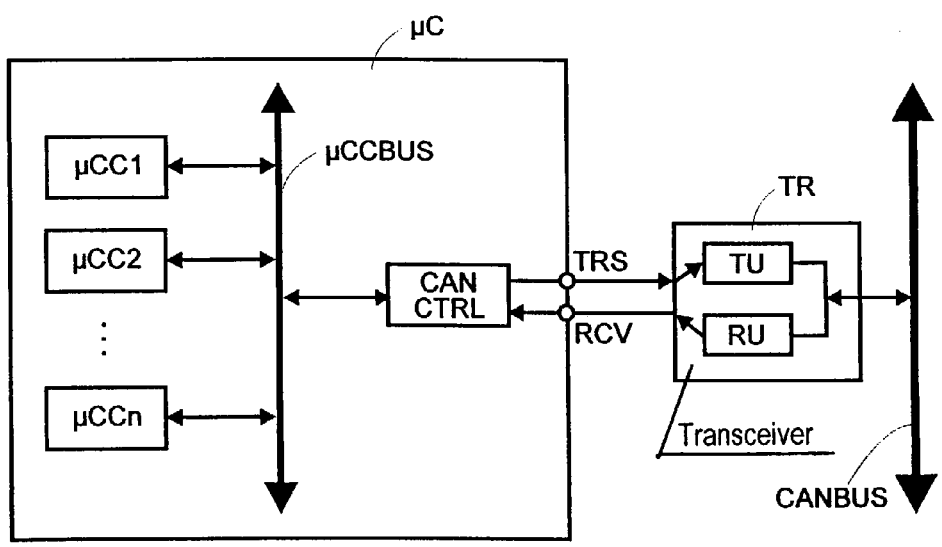
FIG. 2 is a block diagram of a CAN node.

The structure of a node at which the device to be connected to the CAN bus is a microcontroller and is shown in FIG. 2.

The node shown in FIG. 2 contains a microcontroller μC, a CAN controller CANCTRL used for connecting the microcontroller μC to the CAN bus CANBUS, and a transceiver TR. In the example under consideration, the CAN controller CANCTRL is part of the microcontroller μC, but could also be formed by a dedicated chip.

The microcontroller μC contains not only the CAN controller but also a series of further components μCC1 to μCCn which are connected to one another by an internal bus μCBUS in the microcontroller μC. The components μCC1 to μCCn in the microcontroller μC contain, by way of example, one or more CPUs, one or more memories and various peripheral units, such as an A/D converter, a D/A converter, a DMA controller, a timer, a USB interface, etc.

A transceiver TR is connected to the microcontroller μC by a transmit connection TRS and a receive connection RCV on the microcontroller μC. The transceiver TR contains a transmission device TU which outputs data received from the CAN controller CANCTRL onto the CAN bus CANBUS, and a reception device RU which forwards data transmitted via the CAN bus CANBUS to the CAN controller CANCTRL. The transceiver TR is used particularly for level conversion, i.e. for converting the levels which the signals output by the microcontroller have into the levels which the signals transmitted via the CAN bus CANBUS need to have, and for converting the levels which the signals transmitted via the CAN bus CANBUS have into the levels which the signals supplied to the microcontroller need to have.

When the microcontroller μC, more precisely one of the microcontroller components μCC1 to μCCn, wishes to transmit data to one of the nodes N1 to Nn connected to the CAN bus CANBUS, the microcontroller component in question transfers the data via the internal bus μCBUS in the microcontroller μC to the CAN controller CANCTRL. The CAN controller converts the data into the prescribed format, more precisely into a "frame", and outputs the frame onto the CAN bus CANBUS via the transceiver TR at the next possible instant.

In addition, the CAN controller CANCTRL obtains from the transceiver TR the frames transferred via the CAN bus CANBUS, checks whether the data contained therein are intended for the microcontroller, and, if required (if the data are intended for the microcontroller), forwards the user data extracted from the frame to a prescribed component μCCCx in the microcontroller via the internal bus μCBUS.

For the CAN to operate correctly, a series of conditions need to be observed.

One of these conditions is that all the nodes N1 to Nn output the data they output onto the CAN bus CANBUS at the same bit rate or with the same bit timing.

Another condition is that the data transferred via the CAN bus CANBUS have sufficiently steep edges. On the other hand, the edges should not be too steep either, because otherwise excessive electromagnetic interference is produced.

To be able to satisfy these conditions, a test unit needs to take appropriate measurements on the CAN bus, and the nodes connected to the CAN bus, more precisely the CAN controllers at the respective nodes, need to be configured taking into account these measurements.

It ought to be clear that this is associated with a very high level of involvement.

A particularly high level of involvement arises when the data to be transmitted via the CAN bus need to be transmitted at a high data transmission rate, or when the transmitted signals need to have the shallowest possible edge gradient for EMC reasons. This is because the bit timing then needs to be set particularly accurately.

The level of involvement is also particularly high when a new node subsequently needs to be connected to an existing CAN bus and the measurements taken on the CAN bus for this purpose reveal that—as a result of added line capacitances—the edge gradient of the signals output by the nodes already connected to the CAN bus previously is no longer sufficient. In this case, the driver strengths need to be increased at all the nodes.

Corresponding problems can also arise in other bus systems.

Figure 3:
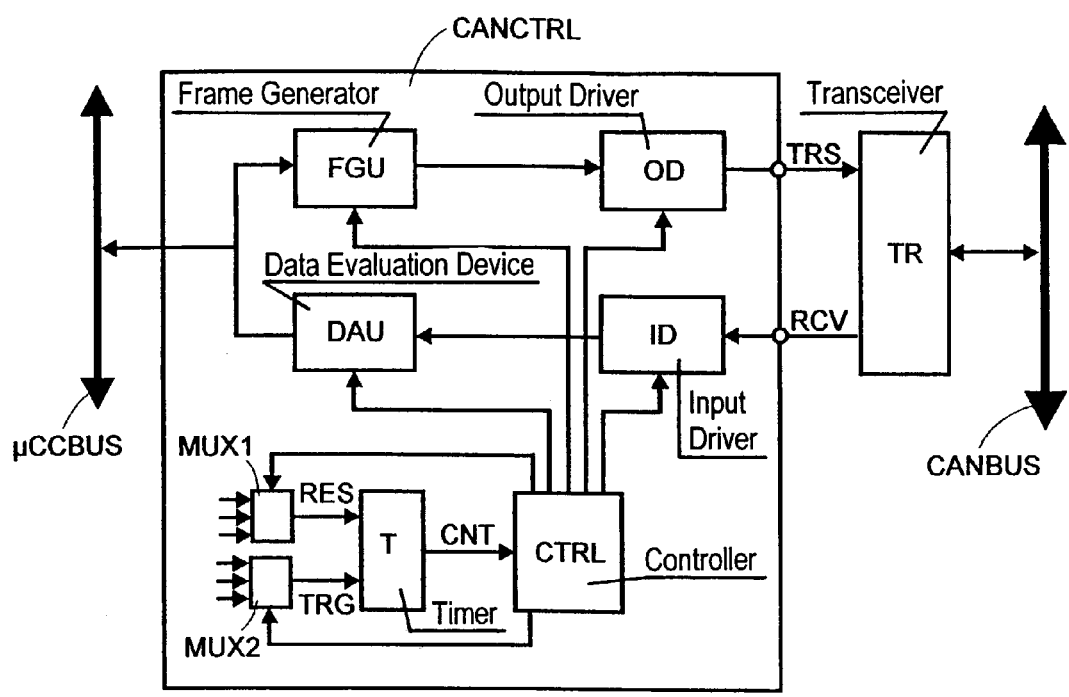
FIG. 3 is a block diagram of a CAN controller.

In FIG. 3 thereof, there is shown a bus interface described below as a CAN controller via which the device to be connected to the CAN bus is connected to the CAN bus. Before continuing, however, it will be pointed out that the special features of the CAN controller described can also be used for any other bus interfaces, i.e. including in bus interfaces for connecting a device to a bus other than a CAN bus.

The device connected to the CAN bus via the described CAN controller is a microcontroller in the example under consideration. It could also be any other device, however.

In the example under consideration, the CAN controller is part of the microcontroller which is to be connected to the CAN bus via the CAN controller. Alternatively, the CAN controller can be provided outside of the microcontroller.

With regard to the configuration of the node containing the described CAN controller and of the bus system containing the node, reference is made to FIGS. 1 and 2 and to the accompanying description.

The CAN controller described has the particular feature that a timer provided in the CAN controller or a timer provided in the chip which contains the CAN controller is used to ascertain the timing of operations taking place within the bus interface and/or on the bus (FIG. 3).

In the example under consideration, both the CAN controller and the chip containing the CAN controller, i.e. the microcontroller containing the CAN controller, contain a timer.

The timer in the microcontroller is one of the microcontroller components μCC1 to μCCn.

The timer in the CAN controller is the timer T that is used to produce the information representing the instant or the order of arrival of the incoming messages, or the number of errors that have occurred during data transmission. The use of a timer provided for the purposes in the CAN controller for the ascertainment operations described in more detail below represents no restriction for the use of the timer. During the ascertainment operations described below, there is generally no problem in foregoing the use of the timer to produce information representing the instant or the order of arrival of the incoming messages, or the number of errors which have occurred during data transmission.

If—in contrast to the example under consideration—neither the CAN controller nor the chip containing the CAN controller contains a timer when it is delivered, the actions described below would require a separate timer to be provided, this timer also being able to perform tasks other than the tasks described below, however.

Preferably, the timer is part of the CAN controller, because it can then be connected more easily to the required internal signals and/or memories and because the delay time of the signals which reset and trigger the timer is then particularly short, and it is therefore possible to ascertain the required variables more accurately.

The configuration of the CAN controller CANCTRL containing a timer is shown in FIG. 3. For the sake of completeness, it will be noted, before continuing, that only those parts of the CAN controller that are of particular interest in the present case are shown and described.

The CAN controller shown in FIG. 3 contains:

a) an output driver OD by which the data (frames) to be output onto the CAN bus CANBUS from the CAN controller CANCTRL (from the microcontroller µC) are output onto the CAN bus, more precisely to the transceiver TR provided between the CAN controller and the CAN bus;

b) an input driver ID via which data transferred to the CAN controller CANCTRL via the CAN bus CANBUS are read into the CAN controller;

c) a frame generation device FGU which produces frames from the data which are supplied to it from the internal bus µCBUS and need to be transmitted to one of the nodes N1 to Nn connected to the CAN bus CANBUS, and the frames are output from the CAN controller CANCTRL via the output driver OD;

d) a data evaluation device DAU which ascertains whether the data which are transmitted via the CAN bus CANBUS and which it receives via the input driver ID are intended for or of interest to the microcontroller, and possibly extracts the user data contained in the frame in question and forwards them to another component in the microcontroller, for example to the CPU, or makes them available for pickup;

e) a timer T described in even more detail below; and f) a control device CTRL which controls the aforementioned other components and possibly further components in the CAN controller.

The timer T has a reset connection RES which can be used to reset it, a trigger connection TRG which can be used to prompt it to increment or decrement its count, and an output connection CNT which it uses to output the respective instantaneous count.

Those components or points to which the reset connection RES and the trigger connection TRG of the timer T are connected depend on the respective use of the timer. In the example under consideration, the signals supplied to the connections of the timer T are selected by a first multiplexer MUX1 connected upstream of the reset connection RES and by a second multiplexer MUX2 connected upstream of the trigger connection TRG. The input connections of the multiplexers MUX1 and MUX2 are connected to the components or points to which the reset connection RES and the trigger connection TRG need to be connected for the various types of use of the timer. The multiplexers are controlled by the control device CTRL. The control device also stipulates the purpose for which the timer T is used in each case.

The multiplexers MUX1 and MUX2 can have a non-illustrated combinational logic unit connected upstream of them which converts the signals available in the CAN controller into the respectively required timer control signals.

The output connection CNT of the timer T is connected at least to the control device CTRL, but is also connected to further components in the CAN controller when the timer is used for purposes other than those described below.

When the timer is used in the ways described below, the counts it delivers are used by the control device CTRL for automatically configuring the frame generation device FGU, the data evaluation device DAU, the output driver OD and/or the input driver ID, and/or output from the CAN controller CANCTRL, or made available for pickup, by the control device CTRL, as a result of which the user of the system is able to check correct operation of the CAN controller and to configure the CAN controller components, which need to be, configured.

It may be found to be an advantage if the timer contains one or more capture registers storing the respective instantaneous count on the timer when particular events occur, provision also being able to be made for the timer to continue to run without interruption when the particular events occur.

The various ways in which the timer can be used are now described below.

A first way of using the timer T is for it to be used to ascertain the time during which a signal corresponding to a bit is transmitted via the CAN bus from the other nodes connected to the CAN bus. Knowledge of this value corresponding to the reciprocal bit rate or knowledge of the bit rate is of great importance for correct operation of the system, because it is imperative to error-free transmission of data via the CAN bus that all the nodes connected to the CAN bus output data which they need to output onto the CAN bus at the same bit rate.

The reciprocal bit rate is ascertained by virtue of the timer T being connected and actuated such that it counts the number of clock pulses in a clock signal produced within or outside of the CAN controller which arise between two successive rising edges of the signal which is output from the input driver ID. Alternatively, provision could be made for the timer T to be connected and actuated such that it counts the number of clock pulses in a clock signal produced within or outside of the CAN controller, which arise between two successive rising edges of the signal, which is output from the input driver ID. Provision could also be made first to count the number of clock signal clock pulses arising between two successive falling edges of the output signal from the input driver ID and then to count the number of clock signal clock pulses arising between two successive falling edges of the output signal from the input driver ID (or vice versa).

The reciprocal bit rate can also be ascertained from the count on the timer T which is obtained when counting the number of clock signal clock pulses arising between a rising edge and the subsequent falling edge in the signal which is output by the input driver ID, or when counting the number of clock signal clock pulses arising between a falling edge and the subsequent rising edge in the signal which is output by the input driver ID.

The way in which the timer T respectively needs to be connected and actuated for this purpose is clear to a person skilled in the art and requires no further explanation.

It is likewise clear that the measurement or measurements need to be taken in phases in which the signal transmitted via the CAN bus changes its level every n bits, n preferably being 1 and being known to the control device (in the case of automatic configuration of the CAN controller) or to the user of the system (when the CAN controller is configured by the user). To get the measurement to be taken in such phases, it is possible for the nodes from which the data on which the measurement is based originate to be prompted to output a particular bit pattern during the measurement, or for the measurement to be taken when known data are being transmitted via the CAN bus.

On the basis of the time count obtained for the measurement, or on the basis of the timer counts obtained for the measurements, the CAN controller component which generates the data to be output onto the CAN bus, that is to say the frame generation device FGU, can be configured such that the data it outputs have the same bit rate as the signals which are output onto the CAN bus from the other nodes. This reconfiguration can be performed automatically by the control device CTRL or as stipulated by the user of the system.

It can prove to be advantageous if the measurement or measurements is/are repeated for data originating from different nodes and if the bit rate to be used by the CAN controller CANCTRL is stipulated taking into account all the measurements. In particular, provision can be made that, if the measurements taken returned different results, the bit rate is stipulated such that the likelihood of errors arising which are caused by an unfavorably chosen bit rate is minimal. This can be achieved, by way of example, by virtue of the bit rate used for the CAN controller CANCTRL being the arithmetic mean of the bit rates at the other nodes, or by virtue of the bit rate used for the CAN controller CANCTRL being the mean between the highest and the lowest bit rate at the other nodes, or by virtue of the bit rate for the CAN controller CANCTRL being stipulated such that the sum of the differences from the bit rates at the other nodes becomes minimal.

Another (second) way of using the timer T involves the timer being used to ascertain an interval of time lying between the instant at which the CAN controller samples a signal supplied to it by the CAN bus and the instant at which the signal to be sampled has the next edge, and/or to ascertain the interval of time which lies between the instant at which the CAN controller samples a signal supplied to it by the CAN bus and the instant at which the signal to be sampled had the last edge.

The intervals of time can be ascertained, by way of example, by virtue of the timer T counting the number of clock pulses in a clock signal supplied to the timer between the instants. The way in which the timer T respectively needs to be connected and actuated for this purpose is clear to a person skilled in the art and requires no further explanation.

From the intervals of time ascertained by the timer T, it is possible to see whether the instant at which the CAN controller samples a signal supplied to it by the CAN bus has been chosen favorably. If the sampling instant is too close to an edge of the signal to be sampled, then there is the risk that an incorrect signal level will be stipulated and used further when sampling the signal.

The situation with the CAN controller is that the period of time reserved for transmitting a bit is divided into a certain number of "time quanta" and that it is stipulated that the bits received will respectively be sampled in a particular time quantum, for example in the sixth time quantum.

If the aforementioned measurement now reveals that the signal to be sampled has an edge very shortly before or after the sampling instant, the sampling instant can be moved to another time quantum, for example to the seventh or to the fifth time quantum, by appropriately reconfiguring that component of the CAN controller which carries out the sampling. This reconfiguration can be performed automatically by the control device CTRL or when prompted externally by the user of the system.

It can prove to be advantageous if the measurement is repeated for data originating from different nodes and if the sampling instant is stipulated such that all the data, i.e. data originating from all nodes, are sampled without error.

A third way of using the timer T involves the timer being used to ascertain a delay time for the data which are to be output onto the CAN bus, i.e. the delay time for the data which are output by the frame generation device FGU within the CAN controller.

In the example under consideration, this is done by virtue of:

a) the control device CTRL or the user of the system connecting the connections TRS and RCV on the microcontroller in order to connect the output connection of the output driver OD and the input connection of the input driver ID to one another, so that a signal which is output from the connection TRS is returned directly, i.e. without taking a detour via the transceiver TR and the CAN bus CANBUS, to the CAN controller CANCTRL again via the connection RCV, and b) the interval of time between the instant at which the frame generation device FGU outputs a bit and the instant at which the bit in question arrives at the data evaluation device DAU being ascertained.

The interval of time can be ascertained, by way of example, by virtue of the timer T counting the clock pulses in a clock signal supplied to it between the instants. The way in which the timer T needs to be connected and actuated for this purpose is clear to a person skilled in the art and requires no further explanation.

The count on the timer T represents the time required for a bit which is output by the frame generation device FGU to be sent to the output driver OD, through the output driver OD, through the input driver ID and on to the data evaluation device DAU.

The count on the timer T can therefore be used to check whether the CAN controller, more precisely its internal delay times, has/have correct values.

The internal delay time, ascertained as described or in another way, and the result of a further measurement using the timer T can also be used to ascertain the optimum driver strength for the output driver OD and/or the optimum driver strength for an output driver contained in the transmission device TU in the transceiver TR.

The further measurement using the timer T, which measurement represents another (fourth) way of using the timer T, measures the time which elapses before a signal which is output by the frame generation device FGU has passed via the output driver OD and the transceiver TR to the CAN bus and from there back again via the transceiver TR and the input driver ID to the data evaluation device DAU.

This time can be ascertained, by way of example, by virtue of the timer T counting the number of clock pulses in a clock signal supplied to it between output of the signal from the frame generation device FGU and receipt of this signal by the data evaluation device DAU. The way in which the timer T needs to be connected and actuated for this purpose is clear to a person skilled in the art and requires no further explanation.

It is important to ascertain the time because it is longer than the sum of the delay times for the signal in question through the CAN controller CANCTRL and the transceiver TR and because the optimum setting for the driver strength of the output driver OD and/or of the output driver in the transmission device TU in the transceiver TR can be ascertained from the size of the difference between the time ascertained by the timer T and the sum of the delay times and/or from the change in the size of the difference on the basis of the setting for the driver strength of the output driver OD and/or of the output driver in the transmission device TU in the transceiver TR.

The reason for the time measured by the timer being longer than the sum of the delay times for the signal in question through the CAN controller CANCTRL and the transceiver TR is as follows:

a) the signal which is output by the output driver OD onto the connecting line to the transceiver TR does not immediately result in a corresponding level change on the connecting line, because the current which is output by the output driver OD first needs to reverse the charge on the capacitor formed by the connecting line, the duration of the charge-reversal procedure being dependent on the length of the connecting line and on the strength of the output driver OD; and b) the signal which is output by the output driver in the transmission device TU in the transceiver TR onto the CAN bus does not immediately result in a corresponding level change on the CAN bus, because the current which is output by the transceiver TR first needs to reverse the charge on the capacitor formed by the CAN bus, the duration of the charge-reversal procedure being dependent on the length of the CAN bus and on the strength of the output driver in the transmission device TU in the transceiver TR.

The duration of the charge-reversal procedures, more precisely the time which elapses between the instant at which the output driver OD outputs a signal having a particular level onto the connecting line to the transceiver TR and the instant at which the connecting line is at the potential from which the signal transmitted via the connecting line is assigned the level of the signal which is output by the transceiver TR, plus the time which elapses between the instant at which the output driver in the transmission device TU in the transceiver TR outputs a signal having a particular level onto the CAN bus and the instant at which the CAN bus is at the potential from which the signal transmitted via the CAN bus is assigned the level of the signal which is output by the transceiver TR, needs to be within a particular range. If it is too long, then this results in that the output driver OD and/or the output driver in the transmission device TU in the transceiver TR is not powerful enough to drive the load represented by the connecting line to the transceiver TR or by the bus; if it is too short, then results in that the output driver OD and/or the output driver in the transmission device TU in the transceiver TR is more powerful than required, and therefore higher levels of electromagnetic interference than necessary are also produced.

The duration of the charge-reversal procedures is the difference between the time ascertained with the fourth way of using the timer T and the sum of the delay times for the signal used for the measurement through the CAN controller CANCTRL and the transceiver TR, these delay times being made up of the time ascertained with the third way of using the timer (signal delay time within CAN controller) and the delay time through the transceiver TR, which can be taken from the datasheet, for example.

If this difference is too great, the output driver OD and/or the output driver in the transmission device TU in the transceiver TR is reconfigured such that the driver strength of the respective output driver is increased; if the difference is too small, the output driver OD and/or the output driver in the transmission device TU in the transceiver TR is reconfigured such that the driver strength of the respective output driver is reduced. The reconfiguration can be performed automatically by the control device CTRL or when prompted externally by the user of the system.

A fifth way of using the timer involves the timer being used to ascertain the time during which the CAN controller outputs a signal corresponding to a bit.

This can be done, by way of example, by virtue of the timer T counting the number of clock pulses in a clock signal supplied to the timer between the rising edge of a signal which is to be output from the CAN controller and the subsequent falling edge of the signal which is to be output from the CAN controller, or between the falling edge of a signal which is to be output from the CAN controller and the subsequent rising edge of the signal which is to be output from the CAN controller.

The way in which the timer T respectively needs to be connected and actuated for this purpose is clear to a person skilled in the art and requires no further explanation.

It is likewise clear that the measurement or measurements need to be taken in phases in which the signal which is to be output from the CAN controller changes its level every n bits, n preferably being 1 and being known to the control device (in the case of automatic configuration of the CAN controller) or to the user of the system (when the CAN controller is configured by the user).

This measurement can be used to observe the synchronization behavior of the CAN controller and to check correct operation of the bit timing logic in the CAN controller, this logic being responsible for the correct timing of the signals (bits), which are output from the CAN controller.

A sixth way of using the timer T involves it being used to produce an information item which can be used to identify the order in which the frames intended for the microcontroller were transmitted via the CAN bus. This information can prove to be advantageous when evaluating the data intended for the microcontroller.

This information can be ascertained, by way of example, by virtue of the timer T counting the frames intended for the microcontroller, that is to say being used as a frame counter. The way in which the timer T needs to be connected and actuated for this purpose is clear to a person skilled in the art and requires no further explanation.

A seventh way of using the timer T involves it being used to produce an information item which is also called a time stamp and which can be used to identify the instant at which the frames intended for the microcontroller reached the microcontroller. This information can prove to be advantageous when evaluating the data intended for the microcontroller.

This information can be ascertained, by way of example, by virtue of the timer T continually counting the clock pulses in a clock signal supplied to it. The way in which the timer T needs to be connected and actuated for this purpose is clear to a person skilled in the art and requires no further explanation.

The various ways of using the timer T, particularly the first to fifth ways of using it, allow the timer to ascertain information which is required for configuring the CAN controller, which information can be ascertained only with a high level of involvement, more slowly, less accurately or not at all by an external test unit.

In addition, the CAN controller described is also capable of matching itself to the given circumstances.

Since the timer can also be used for other purposes (see the sixth and seventh ways of using it) and the known CAN controllers usually already contain a timer when delivered, the use of the timer for obtaining the data required for configuring the CAN controller requires only a negligibly low level of additional involvement.

We claim:

1. A bus interface for connecting a device to a bus connecting a plurality of devices to one another, the bus interface comprising:
a timer for ascertaining a timing of operations taking place within at least one of the bus interface and on the bus, said timer being connected and actuated to ascertain a reciprocal value for a transmission rate of data transferred from another device via the bus.

2. The bus interface according to claim 1, wherein the reciprocal value for the transmission rate is ascertained by virtue of said timer ascertaining a length of time which elapses between an occurrence of two particular edges in a signal transmitted via the bus.

3. The bus interface according to claim 2, wherein the length of time to be ascertained is ascertained by virtue of said timer counting pulses in a clock signal supplied to said timer during a period of time whose length is to be ascertained.

4. The bus interface according to claim 1, wherein a result of the ascertainment is used to stipulate the transmission rate of data needed to be used by the bus interface.

5. A bus interface for connecting a device to a bus connecting a plurality of devices to one another, the bus interface comprising:
a timer for ascertaining a timing of operations taking place within at least one of the bus interface and on the bus, said timer being connected and actuated to ascertain a length of time between an instant at which a signal is sampled and an occurrence of an edge in the signal to be sampled which occurs before or after a sampling instant.

6. The bus interface according to claim 5, wherein a result of the ascertainment is used to stipulate instants at which the bus interface samples signals that are supplied to the bus interface.

7. The bus interface according to claim 5, wherein a result of the ascertainment is used to check a correct operation of the bus interface.

8. The bus interface according to claim 5, wherein the length of time to be ascertained is ascertained by virtue of said timer counting pulses in a clock signal supplied to said timer during a period of time whose length is to be ascertained.

9. A bus system, comprising:
a bus connecting a plurality of devices to one another; and
a bus interface for connecting a device to said bus, said bus interface including:
a timer for ascertaining a timing of operations taking place within at least one of the bus interface and on the bus, said timer being connected and actuated to ascertain an internal signal delay time for the bus interface.

10. The bus system according to claim 9, wherein said bus interface further comprises:
an output connection connected to the bus; and
an input connection connected to the bus, the internal signal delay time is ascertained by ascertaining a length of time which elapses before a signal which is to be output onto the bus has passed from a first location within the bus interface through said output connection and through said input connection to a second location within the bus interface.

11. The bus system according to claim 10, wherein said output connection and said input connection are connected to one another while the internal signal delay time is ascertained.

12. The bus system according to claim 10, wherein the length of time to be ascertained is ascertained by virtue of said timer counting pulses in a clock signal supplied to said timer during a period of time whose length is to be ascertained.

13. A bus system, comprising:
a bus connecting a plurality of devices to one another; and
a bus interface for connecting a device to said bus, said bus interface including:
a timer for ascertaining a timing of operations taking place within at least one of the bus interface and on the bus, said timer being connected and actuated to ascertain a length of time which elapses for a signal which is to be output onto the bus to pass from a first location within the bus interface, over the bus, to a second location within the bus interface.

14. The bus system according to claim 13, wherein a result of the ascertainment is used to set a driver strength for a driver by which signals which are to be output onto the bus from the bus interface are output onto the bus.

15. The bus system according to claim 13, wherein the length of time to be ascertained is ascertained by virtue of said timer counting pulses in a clock signal supplied to said timer during a period of time whose length is to be ascertained.

16. A bus system, comprising:
a bus connecting a plurality of devices to one another; and
a bus interface for connecting a device to said bus, said bus interface including:
a timer for ascertaining a timing of operations taking place within at least one of the bus interface and on the bus, said timer being connected and actuated to generate an information item that indicates an instant at which the bus interface received data transferred via the bus.

17. A bus system, comprising:
a bus connecting a plurality of devices to one another; and
a bus interface for connecting a device to said bus, said bus interface including:
a timer for ascertaining a timing of operations taking place within at least one of the bus interface and on the bus, said timer being connected and actuated to generate an information item that indicates an order in which the bus interface received data transferred via the bus.

18. A circuit for connecting a device to a bus connecting a plurality of devices to one another, the circuit comprising:
a chip containing a timer and a bus interface connected to said timer, said timer ascertaining a timing of operations taking place within at least one of said bus interface and on the bus, said timer being connected and actuated to ascertain a reciprocal value for a transmission rate of data transferred from another device via the bus.

19. The circuit according to claim 18, wherein the reciprocal value for the transmission rate is ascertained by virtue of said timer ascertaining a length of time which elapses between an occurrence of two particular edges in a signal transmitted via the bus.

20. The circuit according to claim 19, wherein the length of time to be ascertained is ascertained by virtue of said timer counting pulses in a clock signal supplied to said timer during a period of time whose length is to be ascertained.

21. The circuit according to claim 18, wherein a result of the ascertainment is used to stipulate the transmission rate of the data needed to be used by the bus interface.

22. A circuit for connecting a device to a bus connecting a plurality of devices to one another, the circuit comprising:
a chip containing a timer and a bus interface connected to said timer, said timer ascertaining a timing of operations taking place within at least one of said bus interface and on the bus, said timer being connected and actuated to ascertain a length of time between an instant at which a signal is sampled and an occurrence of an edge in the signal to be sampled which occurs before or after a sampling instant.

23. The circuit according to claim 22, wherein a result of the ascertainment is used to stipulate instants at which the bus interface samples signals that are supplied to the bus interface.

24. The circuit according to claim 22, wherein a result of the ascertainment is used to check a correct operation of the bus interface.

25. The circuit according to claim 22, wherein the length of time to be ascertained is ascertained by virtue of said timer counting pulses in a clock signal supplied to said timer during a period of time whose length is to be ascertained.

26. A bus system, comprising:
a bus connecting a plurality of devices to one another; and
a circuit for connecting a device to said bus, said circuit including:
a chip containing a timer and a bus interface connected to said timer, said timer ascertaining a timing of operations taking place within at least one of said bus interface and on the bus, said timer being connected and actuated to ascertain an internal signal delay time for the bus interface.

27. The bus system according to claim 26, wherein said circuit further comprises:
an output connection connected to the bus; and
an input connection connected to the bus, the internal signal delay time is ascertained by ascertaining a length of time which elapses for a signal which is to be output onto the bus passes from a first location within the bus interface through said output connection and through said input connection to a second location within the bus interface.

28. The bus system according to claim 27, wherein said output connection and said input connection are connected to one another while the internal signal delay time is ascertained.

29. The bus system according to claim 27, wherein the length of time to be ascertained is ascertained by virtue of said timer counting pulses in a clock signal supplied to said timer during a period of time whose length is to be ascertained.

30. A bus system, comprising:
a bus connecting a plurality of devices to one another; and
a circuit for connecting a device to said bus, said circuit including:
a chip containing a timer and a bus interface connected to said timer, said timer ascertaining a timing of operations taking place within at least one of said bus interface and on the bus, said timer being connected and actuated to ascertain a length of time which elapses for a signal which is to be output onto the bus to pass from a first location within the bus interface through the bus to a second location within the bus interface.

31. The bus system according to claim 30, wherein a result of the ascertainment is used to set a driver strength for a driver by which signals which are to be output onto the bus from the bus interface are output onto the bus.

32. The bus system according to claim 30, wherein the length of time to be ascertained is ascertained by virtue of said timer counting pulses in a clock signal supplied to said timer during a period of time whose length is to be ascertained.

33. A bus system, comprising:
a bus connecting a plurality of devices to one another; and
a circuit for connecting a device to said bus, said circuit including:
a chip containing a timer and a bus interface connected to said timer, said timer ascertaining a timing of operations taking place within at least one of said bus interface and on the bus, said timer being connected and actuated to generate an information item that indicates an instant at which the bus interface received data transferred via the bus.

34. A bus system, comprising:
a bus connecting a plurality of devices to one another; and
a circuit for connecting a device to said bus, said circuit including:
a chip containing a timer and a bus interface connected to said timer, said timer ascertaining a timing of operations taking place within at least one of said bus interface and on the bus, said timer being connected and actuated to generate an information item that indicates an order in which the bus interface received data transferred via the bus.

* * * * *